United States Patent [19]

Fukuda et al.

[11] Patent Number: 4,991,040
[45] Date of Patent: Feb. 5, 1991

[54] TAPE RECORDER WHICH DISPLAYS UNRECORDED TIME ON MAGNETIC TAPES

[75] Inventors: Nobutoshi Fukuda; Tomoyasu Yamada, both of Saitama, Japan

[73] Assignee: Pioneer Electronic Corporation, Tokyo, Japan

[21] Appl. No.: 331,417

[22] Filed: Mar. 31, 1989

[30] Foreign Application Priority Data

Aug. 16, 1988 [JP] Japan .................... 63-202643
Aug. 16, 1988 [JP] Japan .................... 63-202644

[51] Int. Cl.⁵ ............................... G11I 15/68
[52] U.S. Cl. ............................ 360/92; 360/137
[58] Field of Search .................... 360/137, 92, 91

[56] References Cited

FOREIGN PATENT DOCUMENTS 0026095 4/1981 European Pat. Off. .
0064674 11/1982 European Pat. Off. .
0107307 5/1986 European Pat. Off. .
0204626 12/1986 European Pat. Off. .

OTHER PUBLICATIONS

"Building Bridges and Gateways," *Macworld*, Oct. 1987, pp. 130–135, Meng.

*Primary Examiner*—Robert S. Tupper
*Assistant Examiner*—Andrew L. Sniezek
*Attorney, Agent, or Firm*—Sughrue, Mion, Zinn, Macpeak & Seas

[57] ABSTRACT

A tape recorder may be provided with a memory which stores data regarding the unrecorded portion remaining on each of a plurality of recording tapes. The data may represent an amount of the unrecorded portion and/or the location thereof, e.g., in the form of a counter value. The data stored in the memory is displayed in response to an input from an operating panel, thus making it possible to readily identify a tape having a remaining time equal to or greater than the quantity of information to be recorded, and to quickly advance the tape to the beginning of its unrecorded portion.

16 Claims, 4 Drawing Sheets

TAPE RECORDER WHICH DISPLAYS UNRECORDED TIME ON MAGNETIC TAPES

BACKGROUND OF THE INVENTION

The present invention relates to a tape recorder for recording information on a magnetic tape or reproducing information from a magnetic tape by transferring a designated cassette half via a cassette transfer device between a housing which houses a plurality of cassette halves and a tape running device. As used herein the term cassette half refers to a cassette of the type having a single reel, as opposed to both supply and take-up reels included in a full cassette.

In a prior art tape recorder of the above type the remaining time (the time corresponding to the unrecorded portion of the magnetic tape) of the magnetic tape accommodated in the cassette half computed according to a known method is displayed in a display. Accordingly, the remaining time of a cassette half under recording or reproducing can be confirmed by visually recognizing the display corresponding to the cassette half.

However prior art tape recorders are constructed so that the remaining time displayed in the display is cleared when a cassette half is transferred out of the tape running device to the housing by means of the transfer device. Therefore, it is possible to recognize the remaining time of only those cassette halves that are in the tape running device.

Therefore when making a recording of information with a predetermine recording length (for example music) on a magnetic tape of one of the cassette halves housed in the housing, it may not be possible to determine which cassette has a remaining time longer than the predetermined recording length, even after carrying out recording or reproducing for all of the cassette halves. Hence, it becomes necessary to reexamine the remaining time of all of the cassette halves in succession, with the result that it takes a long time to select a cassette half with a desired amount of remaining time.

A tape recorder has been known which has a display which displays the counter values for the running time and the distance covered on a magnetic tape accommodated in a cassette half. This occurs when recording information on a magnetic tape or reproducing information from a magnetic tape accommodated in a cassette half which has been transferred from the housing to the tape running device by means of the cassette transfer device. In such a tape recorder, the counter values of a cassette half under recording or reproduction can be confirmed by visually checking the display.

However such a tape recorder is constructed in such a way that, when a cassette half is transferred from the tape running device to the housing by means of the transfer device, the counter values of the cassette half which have been displayed in the display are cleared. Consequently it is only possible to know the counter value of the cassette half which is presently contained in the tape running device.

Therefore, to listen to a desired music selection, for example, by setting the magnetic tape of a certain cassette half at a predetermined position, it becomes necessary to run the magnetic tape to the desired position after rewinding the magnetic tape to the beginning of the tape since the counter values are unavailable. For this reason, a problem has been that it takes a long time to set the magnetic tape at a desired position.

SUMMARY OF THE INVENTION

The present invention has been developed to solve the aforementioned problem, and it is an object of the present invention to provide a tape recorder which enables easy confirmation of the unrecorded time remaining on a cassette half housed in the housing.

In order to achieve the above-mentioned object, the tape recorder of the present invention is constructed so that a memory is provided for storing in respective memory locations the unrecorded time remaining on a plurality of cassette halves housed in the housing. The remaining time obtained by unthreading a magnetic tape in a cassette half designated by the cassette running device is stored in the memory location corresponding to that cassette half.

A tape recorder of the present invention with a construction as above stores the remaining time obtained when the magnetic tape housed in a cassette half has been transferred from the housing to the tape running device by means of the transfer device. Accordingly, the remaining times of the cassette halves may be determined by referring to the remaining times stored in the memory after the remaining times of all of the cassette halves have been stored.

It is a further object of the present invention to provide a tape recorder which is capable of readily setting a magnetic tape at a desired position in a short time.

In order to achieve the above-mentioned object, a memory is provided for storing the counter values of a plurality of cassette halves in respective memory locations. The counter values are obtained during unthreading of a magnetic tape in a cassette half designated by the cassette running device, and are stored in the corresponding memory location in the memory.

A tape recorder in accordance with this second aspect of the present invention stores the counter values which are obtained during unthreading of a magnetic tape accommodated in a cassette half transferred from the housing to the tape running device by means of the tape transfer device. During a rethreading of the magnetic tape of the cassette half in the tape running device, the tape recorder then displays the counter values obtained during a previous unthreading of the tape.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Figure 1:
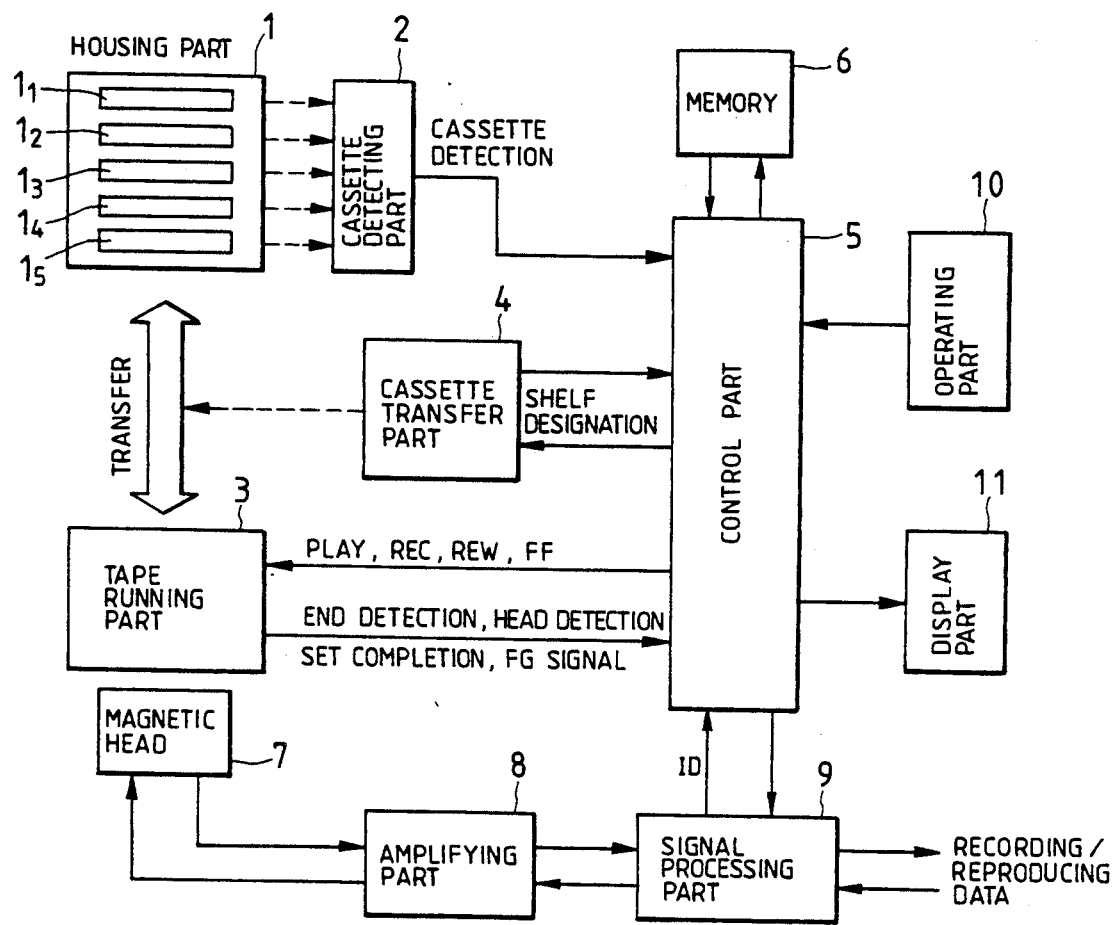
FIG. 1 is a block diagram showing the constitution of a tape recorder in accordance with a first embodiment of the present invention.

Referring to the drawings, a first embodiment of the present invention will be described.

Figure 2:
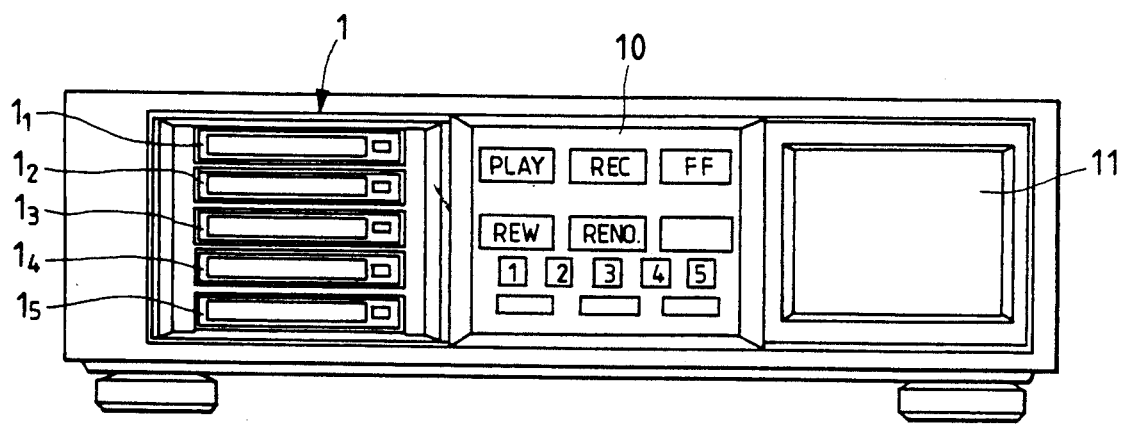
FIG. 2 is a front view of the tape recorder.

FIG. 1 is a block diagram showing the constitution of the tape recorder in accordance with the first embodiment of the present invention, and FIG. 2 is a front view of the tape recorder.

In FIGS. 1 and 2 reference numeral 1 shows a housing for housing a plurality of cassette halves. Housing shelves $1_1$-$1_5$, open to the front panel and extending toward the inside of the unit, house five reels such as cassette halves. Each of the housing shelves $1_1$-$1_5$ has a cassette holder for holding a cassette half inserted into the shelf.

Reference numeral 2 shows a cassette detector for detecting the insertion of cassette halves into the housing shelves $1_1$-$1_5$. It consists of a cassette detecting switch for detecting the presence of cassette halves in each of the housing shelves $1_1$-$1_5$, and a carrier detecting switch for detecting that a carrier of the cassette transfer device 4 exists for transferring a cassette half from each of the housing shelves $1_1$-$1_5$ to the tape running device 3 or from the tape running device 3 to each of the housing shelves $1_1$-$1_5$.

Accordingly, whether or not a cassette half is contained in each of the housing shelves $1_1$-$1_5$ (including when the cassette halves inserted in each of the housing shelves $1_1$-$1_5$ are transferred to the tape running device 3) can be determined by the combination of the signals detected by the cassette detecting switch and the carrier detecting switch.

Reference numeral 3 is a tape running device for recording information on and reproducing information from a magnetic tape by driving the hub of the cassette half placed on a reel table. Reference numeral 4 is a cassette transfer device which transfers a cassette half from each of the cassette shelves $1_1$-$1_5$ of the housing 1 to the tape running device 3 or from the tape running device 3 to each of the housing shelves $1_1$-$1_5$. It is equipped with a carrier for transferring a holder of each of the housing shelves and a cassette half.

Reference numeral 5 is a controller having a microprocessor or the like. The controller oversees the transfer of cassette halves housed in the housing shelves $1_1$-$1_5$, in the order designated by an operating panel 10, to the tape running device 3 by means of the cassette transfer device 4. The controller also oversees the recording of information on a magnetic tape housed in a cassette half and the reproducing of information from a magnetic tape. If the remaining time of a cassette half is known at the time of unthreading a tape in the tape running device 3, it is stored in the corresponding memory location M(i) of the memory 6 corresponding to a respective housing shelf $1_i$. If the remaining time is not known at that time, a remaining time of zero is stored in memory location M(i).

Reference numeral 7 designates a helical scan type magnetic head, 8 is an amplifier and 9 is a signal processor. During recording, the output of the signal processor 9 which has been subjected to recording data signal processing is amplified in the amplifier 8, and the RF signals are then recorded on a magnetic tape of the tape running device 3 by means of the magnetic head 7. During reproducing. RF signals derived from a magnetic tape of the tape running device 3 with the magnetic head 7 are amplified in the amplifier 8 and are then subjected to reproduction signal processing in the signal processor 9.

Reference numeral 10 designates an operating panel provided with operation mode keys such as reproducing (PLAY). recording (REC). fast forward (FF). and rewind (REW), and various kinds of operating keys for designating the number of relevant housing shelves $1_1$-$1_5$ of the housing 1.

Reference numeral 11 designates a display which displays various kinds of information such as the operating mode, which one of the housing shelves $1_1$-$1_5$ the cassette half presently in the tape running device 3 belongs to, and time information.

Here, the remaining time is computed based on the RF signal of the tape running device 3, the RF signal of the signal processor 9, the distance covered by the running of the tape, and the like, and is displayed on the display 11.

Further, memory 6 is either a nonvolatile memory or is backed up so that relevant information is not lost.

The operation of the present invention will now be described with reference to FIG. 3 which is a flow chart of steps ST1-ST19 involved in the operation of checking the remaining time.

Figure 3:
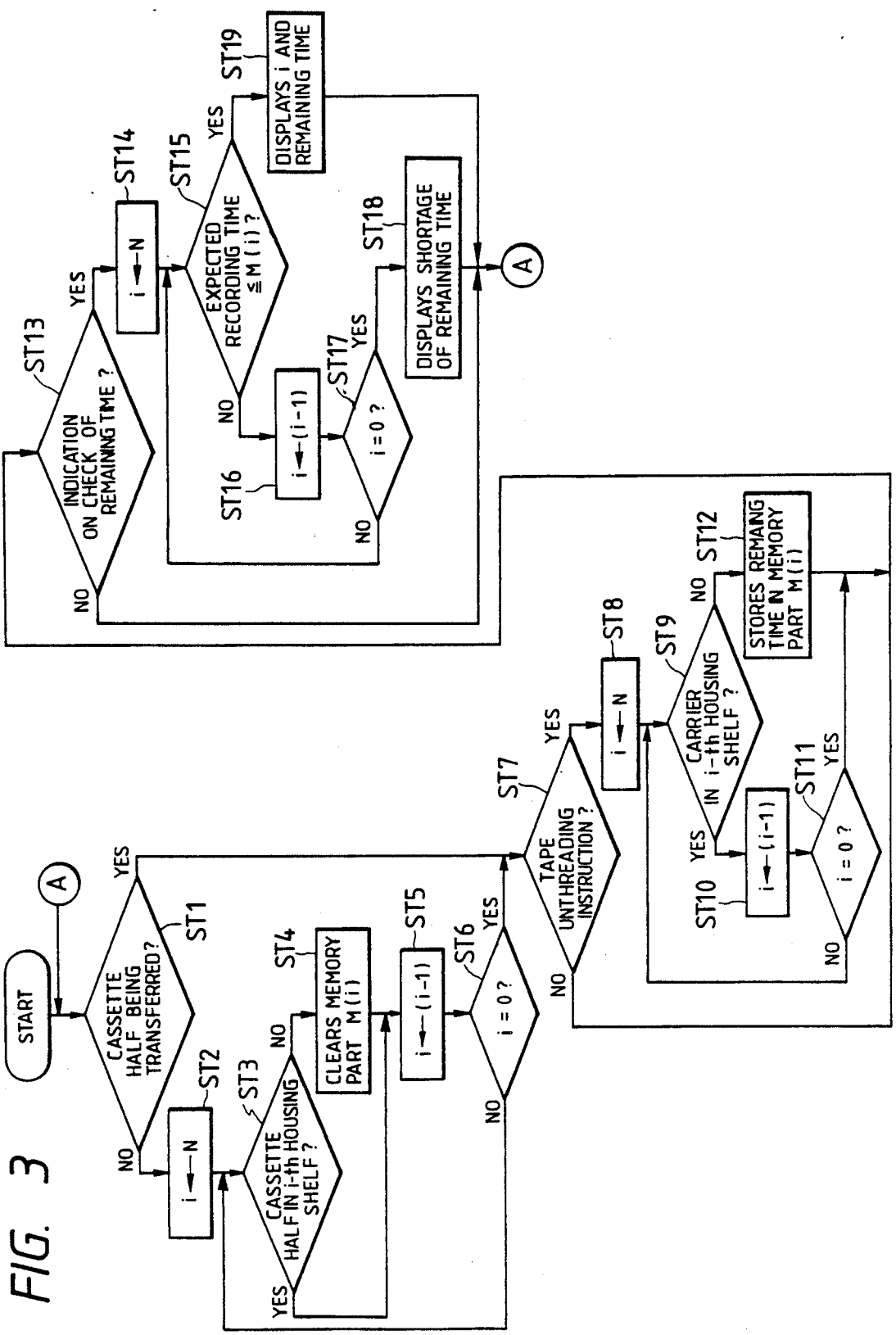
FIG. 3 is a flow chart for explaining the operation of checking the remaining time.

The flow chart in FIG. 3 starts with the application of the power supply. First, step ST1 determines whether the cassette halves are being transferred (that is, whether the cassette transfer device 4 is being operated). When the cassette halves are not being transferred, a variable i is set in step ST2 to equal to a number N (N=5 in this embodiment) of housing shelves $1_1$-$1_5$ in the housing 1.

Next, step ST3 determines whether there is a cassette half in housing shelf $1_i$, namely, whether the cassette half of the i-th housing shelf has been taken out. When a cassette half is not found in the i-th housing shelf, memory location M(i) of memory 6 which corresponds to housing shelf $1_i$ is cleared in step ST4.

After step ST4 or when there is a cassette half in the i-th housing shelf in step ST3, i is decremented by 1 at step ST5, and step ST6 then determines whether i is equal to zero.

Next, when i is not equal to zero in step ST6. control returns to step ST3. When i is equal to zero in step ST6 or when the cassette halves are transferred in step ST1, step ST7 determines whether there is a tape unthreading instruction indicating that a tape, if any, currently in the tape running device 3 is to be unthreaded from the device 3, the system determines which housing shelf this tape corresponds to by steps ST8 through ST11.

In step ST8, i is set equal to N. Then, step ST9 determines whether a carrier is in the i-th housing shelf $1_i$. When there is a carrier in the i-th housing shelf, i is decremented by one in step ST10. Step ST11 then determines whether i is equal to zero. Next, when i is not equal to zero in step ST11, control returns to step ST9.

When a carrier is not in the i-th housing shelf $1_i$ in step ST9 and the remaining time is known, the remaining time is stored in memory location M(i) of memory 6 in step ST12.

Next, when i is equal to zero in step ST11 (indicating that there is no tape in the running device 3). or after step ST12, or when there is no tape unthreading instruction of the magnetic tape in step ST7, step ST13 determines whether there has been an instruction from the operating panel 10 to check the remaining time. When there was an indication to check for a remaining time of, e.g.. 20 minutes, i is again set equal to N in step ST14.

Then, step ST15 determines whether the remaining time for tape #N is equal to or greater than the expected recording time of 20 minutes.. When the remaining time is less than 20 minutes, i is decremented by one in step ST16.

Step ST17 then determines whether i is equal to zero. When i is not equal to zero in step ST17, control returns to step ST15. When i is equal to zero in step ST17, a shortage of remaining time is displayed in display 11 in step ST18.

When the remaining time for an i-th tape is equal to or greater than the expected recording time of 20 minutes in step ST15. i and the remaining time are displayed in the display 11 in step ST19.

After step ST19 or after step ST18, or when there was not an instruction to check for remaining time in step ST12, control returns to step ST1.

In the above embodiment, by issuing an indication from the operating panel 10 to check for a designated remaining time, the number (i) of the corresponding housing shelf from among shelves $1_1$–$1_5$ and the remaining time are displayed in the display 11 if a cassette half in housing 1 has a remaining time equal to or greater than the designated remaining time. Therefore, it is easy to confirm whether any cassette halves housed in housing 1 have a desired remaining time.

Figure 4:
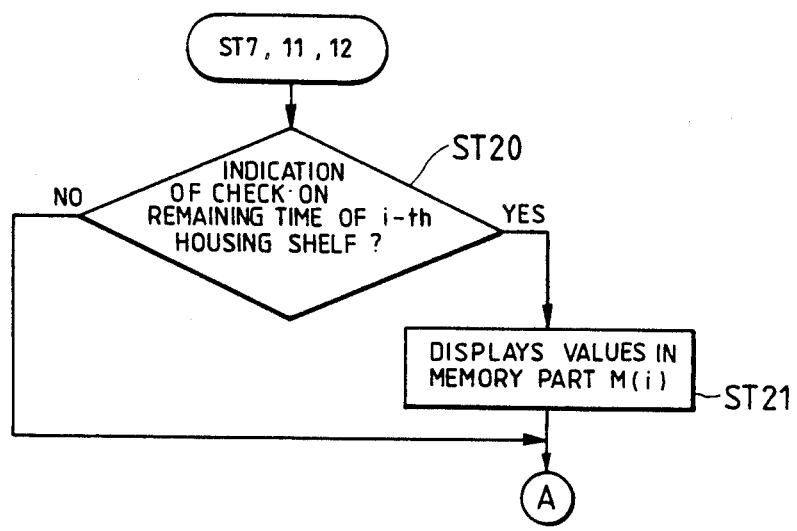
FIG. 4 is a partial flow chart showing a part of the flow chart which is different from that of FIG. 3 for showing another method of checking the remaining time.

FIG. 4 is a partial flow chart showing a part of the flow chart with some of the same steps as the flow chart in FIG. 3 illustrating another method of checking the remaining time.

As in the description of FIG. 3 when i is equal to zero in step ST11, or following step ST12, or when there is no tape unthreading instruction in step ST7, step ST2O determines whether there was an instruction from the operating panel 10 to check the remaining time of the i-th cassette half. When there was an instruction from the operating panel 10 to check the remaining time of the i-th cassette half, the remaining time in memory location M(i) is displayed in the display 11 (ST21).

After step ST21 or when there was no instruction from operating panel 10 to check the remaining time of the i-th cassette half in step ST2O control returns to step ST1.

Accordingly, by checking the remaining time by designating a particular one of the housing shelves $1_1$–$1_5$ as in FIG. 4, it is possible to more clearly recognize the remaining time of the cassette half housed in each of the housing shelves $1_1$–$1_5$.

It should be noted that in the above description the remaining time obtained at the time of unthreading a magnetic tape of a cassette half in the tape running device 3 is stored in memory location M(i) of memory 6 in step ST12, and the remaining time displayed an display 11 at step ST19 may be either from the same or a different cassette half. When the remaining time is being displayed in step ST19 after a tape unthreading i.e.. if steps ST8 through ST12 were followed during the last pass through the flow chart of FIG. 3, it is preferable to indicate if the remaining time being displayed does not correspond to the cassette half currently in the tape running device 3 by means of flashing or the like of the display.

As described in the foregoing, according to the present invention, a memory is provide for storing the remaining time of each of a plurality of cassett halves in corresponding memory locations, a remaining time obtained by unthreading a magnetic tape of a cassette half designated by the cassette running device is stored in the corresponding memory location of the memory, and the remaining time of a cassette half stored in the memory is displayed in the display in response to an input from the operating panel. Therefore, its is possible to readily identify a cassette half having a remaining time equal to or greater than the quantity of information to be recorded through operation of the operating panel.

A second embodiment of the present invention will now be described with reference to FIG. 5. In this embodiment, the counter value of each cassette half obtained by unthreading a magnetic tape in the tape running device 3 is stored in a corresponding memory location M(i) of the memory 6. These counter values are detected in accordance with known means and are displayed in the display 11. The tape recorder is otherwise similar to the embodiment described previously.

Figure 5:
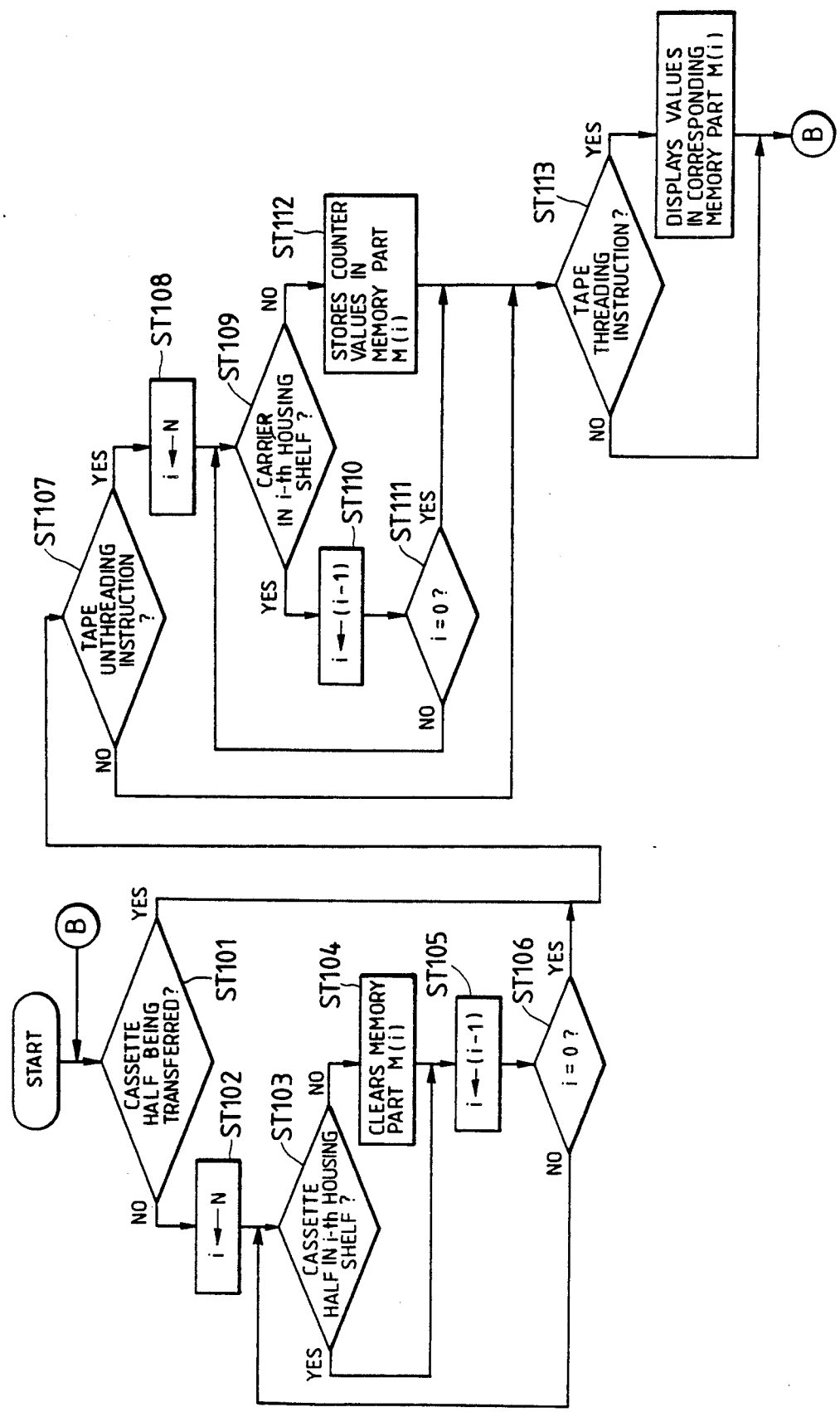
FIG. 5 is a flow chart for explaining the storage and display operations of the counter values in a tape recorder in accordance with a second embodiment of the present invention.

FIG.5 is a flow chart for explaining the storage and display operations of the counter values in the tape recorder of the present invention. Steps ST101 through ST111 of the flow chart in FIG. 5 are the same as steps ST1 through ST11 of the flow chart in FIG. 3. Therefore, a description of these steps is omitted here. Steps ST112 through ST114 will now be described.

When there is no carrier in the i-th housing shelf $1_i$ in step ST109, the counter values are stored in memory location M(i) of memory 6 in step ST112.

Next, when i is equal to zero in step ST111, or after step ST112, or when there is no instruction for unthreading of a magnetic tape in step ST107, step ST113 determines whether there is an instruction for threading of a magnetic tape, and when there is an instruction for tape threading, the values stored in the corresponding memory location M(i) are displayed in the display 11 in step ST114.

After step ST114 or when no magnetic tape threading instruction has occurred in step ST113. control returns to step ST101.

The counter value obtained by unthreading a magnetic tape in a cassette half of the tape running device 3 are stored in memory location M(i) of memory 6. The values of memory locations M(i) corresponding to a separate or the same cassette half are displayed in the display 11. However, when displaying values stored in memory location M(i) after an unthreading. i.e.. if step ST114 is arrived at by passing through steps ST1O9 through ST112, it is preferable to indicate by flashing or the like any value displayed in display 11 which corresponds to a tape other than the tape being threaded.

As in the above, it is possible to display at the time of rethreading the counter values obtained by the previous unthreading of a tape, so that a magnetic tape of a cassette half can be set at a desired position in a short time.

As described above, according to the present invention, a memory is provided for storing counter values for each of a plurality of cassette halves in each of a plurality of memory locations, the counter values obtained by unthreading a magnetic tape in a cassette half designated by the cassette running device are stored in a corresponding memory location, and the counter values stored in the memory at the time of rethreading of a designated cassette half are displayed in a display. Therefore, a magnetic tape in a cassette half can be set at a desired position in a short time.

What is claimed is:

1. A tape recorder which records/reproduces information on a plurality of recording tape cassettes each containing a magnetic tape therein, comprising;
   a housing for housing the plurality of recording tape cassettes;
   tape transducing means for recording information on or reproducing information from a selected one of the recording tape cassettes when said selected recording tape cassette is transferred from said housing to a tape running means;
   transfer means for transferring said selected recording tape cassette between said housing and said tape running means;
   a memory having respective memory locations for storing data corresponding to an amount of unrecorded tape remaining on each of said recording tape cassettes;
   a display for displaying said stored data; and
   control means for causing said display to display said stored data, said control means being operable for causing said display to display the stored data when each of the plurality of tape cassettes is housed in said housing and none of the plurality of recording tape cassettes is transferred to said tape running means.

2. A tape recorder as claimed in claim 1, further comprising means for erasing stored data corresponding to a particular tape when said particular tape is removed from said housing.

3. A tape recorder as claimed in claim 1, further comprising means for designating a desired recording time and wherein said control means causes said display to display data corresponding to the unrecorded portion of each tape cassette which is greater than or equal to said desired recording time.

4. A tape recorder as claimed in claim 3, wherein said control means causes the display to display data representing a shortage of an unrecorded portion of tape of each tape cassette when all of said stored data represents unrecorded portions which are less than said desired recording time.

5. A tape recorder as claimed in claim 1, further comprising means for designating a particular one of said tape cassettes and means for causing said display to display data regarding the unrecorded portion of said particular tape cassette.

6. A tape recorder as claimed in claim 1, further comprising means for causing said display to display the stored data corresponding to each of said tape cassettes in succession.

7. A tape recorder as claimed in claim 1, wherein said memory is a nonvolatile memory.

8. A tape recorder as claimed in claim 1, wherein said stored data represents a location of said unrecorded portion of each tape cassette.

9. A tape recorder, comprising:
   an operating panel;
   a housing for housing a plurality of tape cassettes each containing a magnetic tape therein;
   a tape transducing means for recording information on or reproducing information from one of said tape cassettes when said one tape cassette is transferred from said housing to a tape running means;
   means responsive to an input from said operating panel for transferring one of the plurality of tape cassettes from said housing to said tape running device;
   a memory having respective memory locations for storing data corresponding to unrecorded portions of tape remaining on each of said tape cassettes;
   a display for displaying said stored data; and
   control means, responsive to an input from said operating panel for causing said display to display said stored data, said control means operable in response to said input for causing said display to display said stored data when all of the tape cassettes are housed in the housing and none of the tape cassettes is transferred to said tape running device.

10. A tape recorder as claimed in claim 9 further comprising means for erasing data corresponding to a particular cassette when said particular tape cassette is transferred from said housing.

11. A tape recorder as claimed in claim 9, wherein said stored data represents an amount of unrecorded portion remaining on each tape cassette.

12. A tape recorder as claimed in claim 11, further comprising means for designating a desired recording time and means for causing said display to display data corresponding to the unrecorded portion of each tape cassette which is greater than or equal to said desired recording time.

13. A tape recorder as claimed in claim 12, wherein said control means causes the display to display data representing a shortage of an unrecorded portion of tape of each tape cassette when all of said stored data represents unrecorded tape portions of less than said desired recording time.

14. A tape recorder as claimed in claim 9, further comprising means for designating a particular one of said tape cassettes, and wherein said control means causes said display to display data regarding theunrecorded portion of said particular tape cassette.

15. A tape recorder as claimed in claim 9, wherein said control means causes said display to display the stored data corresponding to each of said tape cassettes in succession.

16. A tape recorder as claimed in claim 9, wherein said memory is a nonvolatile memory.

* * * * *